US011353954B2

(12) United States Patent
Bhat et al.

(10) Patent No.: US 11,353,954 B2
(45) Date of Patent: Jun. 7, 2022

(54) OPERATING AN ELECTRONIC CONTACT LENS BASED ON RECOGNIZED OBJECTS IN CAPTURED IMAGES

(71) Applicant: Tectus Corporation, Saratoga, CA (US)

(72) Inventors: Abhishek Deepak Bhat, Sunnyvale, CA (US); Ramin Mirjalili, San Jose, CA (US); Joseph Czompo, San Jose, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 59 days.

(21) Appl. No.: 17/003,932

(22) Filed: Aug. 26, 2020

(65) Prior Publication Data

US 2022/0066549 A1    Mar. 3, 2022

(51) Int. Cl.
*G06F 3/01* (2006.01)
*G02C 7/04* (2006.01)
*G02C 7/08* (2006.01)
*G06V 20/20* (2022.01)

(52) U.S. Cl.
CPC ............. *G06F 3/013* (2013.01); *G02C 7/049* (2013.01); *G02C 7/083* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 6,851,805 B2 | 2/2005 | Blum | |
| 2003/0021601 A1 | 1/2003 | Goldstein | |
| 2015/0070262 A1 | 3/2015 | Peters | |
| 2016/0091737 A1 | 3/2016 | Kim | |
| 2016/0097940 A1 | 4/2016 | Sako | |
| 2016/0299354 A1 | 10/2016 | Shtukater | |
| 2016/0379054 A1 | 12/2016 | Sicari | |
| 2017/0270636 A1 | 9/2017 | Shtukater | |
| 2017/0371184 A1* | 12/2017 | Shtukater | ........... G02B 27/0093 |
| 2018/0017811 A1 | 1/2018 | Perozziello | |

(Continued)

OTHER PUBLICATIONS

Wu et al., "Eulerian Video Magnification for Revealing Subtle Changes in the World" ACM Trans Graphics v31 n4 2012, 8 pages.

(Continued)

*Primary Examiner* — Vu Nguyen
(74) *Attorney, Agent, or Firm* — Amsel IP Law PLLC; Jason Amsel

(57) ABSTRACT

An augmented reality system recognizes objects in a user's environment and operates an electronic contact lens based on the recognition. The electronic contact lens includes an integrated femtoimager that captures images corresponding to the user's gaze direction. The augmented reality system recognizes objects in the images and generates visual information relevant to the recognized objects that is presented using a femtoprojector integrated with the electronic contact lens. The visual information may include virtual control elements that the user can interact with to control smart devices. The augmented reality system can also configure various calibration parameters of the electronic contact lens based on a recognized environment associated with the recognized objects.

23 Claims, 12 Drawing Sheets

(56) References Cited

U.S. PATENT DOCUMENTS

| | | | |
|---|---|---|---|
| 2018/0136492 A1 | 5/2018 | An | |
| 2018/0316224 A1 | 11/2018 | Maynard | |
| 2018/0373058 A1 | 12/2018 | Bostick | |
| 2019/0004325 A1 | 1/2019 | Connor | |
| 2019/0060602 A1* | 2/2019 | Tran | G16H 20/30 |
| 2019/0178638 A1* | 6/2019 | Abovitz | G06F 16/7837 |
| 2019/0235276 A1* | 8/2019 | Wiemer | G02C 11/10 |
| 2019/0385342 A1 | 12/2019 | Freeman | |
| 2020/0152083 A1* | 5/2020 | Dialameh | G09B 21/005 |
| 2020/0201073 A1 | 6/2020 | Lemoff | |

OTHER PUBLICATIONS

Cardinal. These Smart Contact Lenses Overlay Info Without Obscuring Your View. Jun. 2, 2020 (Jun. 2, 2020). [retrieved on Jan. 27, 2022]. Retrieved from the Internet: <URL:https://www.extremetech.com/extreme/311066-mojo-vision-smart-contact-lenses> entire document.

* cited by examiner

OPERATING AN ELECTRONIC CONTACT LENS BASED ON RECOGNIZED OBJECTS IN CAPTURED IMAGES

BACKGROUND

1. Technical Field

This disclosure relates generally to operating an electronic contact lens based on recognized objects.

2. Description of Related Art

Various augmented reality display systems exist in which virtual objects or information are overlaid with a real-world view of an environment. Conventional augmented reality systems are typically embodied as bulky head-mounted devices that include a display screen providing the augmented reality view. A problem with such systems is that they lack specific context about where the user's attention is focused at any particular time, and thus the system may either fail to provide information about a particular point of focus, or the system may overwhelm the user with information that is not of interest at that moment.

Some augmented reality systems rely on voice or gesture commands from the user to control what contextual information is displayed. However, such systems can be burdensome to use and prevent the user from interacting naturally with the environment. Other systems employ complex eye tracking algorithms that capture images of the user's eye and attempt to detect where the user is looking. However, these systems are expensive, challenging to implement and prone to errors.

DETAILED DESCRIPTION

An augmented reality system recognizes objects in a user's environment based on images captured by an electronic contact lens and provides visual information or otherwise controls operation of the electronic contact lens in response to the recognized objects. The electronic contact lens is an eye-mounted device that includes an outward facing femtoimager that captures images of the user's environment and an inward facing femtoprojector that projects images onto the user's retina. The augmented reality system may also include an accessory device that is wirelessly coupled to the electronic contact lens and optionally performs external processing to offload computational load from components in the contact lens. The accessory device may communicate with a remote server that can perform additional processing or return relevant information.

In an example process, the femtoimager captures one or more images of a user's surrounding environment. The augmented reality system performs object recognition on the one or more images to generate a recognition result indicating a recognized object. The recognition result is processed to generate relevant information, which the femtoprojector projects as images onto the user's retina.

In another example, the augmented reality system determines when a recognized object is a device associated with a controllable function (e.g., a smart light switch). Here, the femtoimager projects a virtual control element for controlling the device. The user can interact with the virtual control element to control the device. The augmented reality system then transmits a control signal (e.g., to the device or associated smart hub) to control the function of the recognized device (e.g., to turn the switch on or off).

As another example, a recognition result identifies an environment of the user and the augmented reality system automatically executes an application controlling the electronic contact lens associated with the identified environment. For example, if the environment is recognized as the inside of a vehicle, an in-vehicle application may execute that causes the femtoprojector to display images relevant to driving the vehicle. Additionally, the augmented reality system can automatically calibrate components of the electronic contact lens based on the detected environment.

Figure 1A:
FIG. 1A shows a user wearing an electronic contact lens containing a projector (femtoprojector) and an imaging device (femtoimager).
Figure 1B:
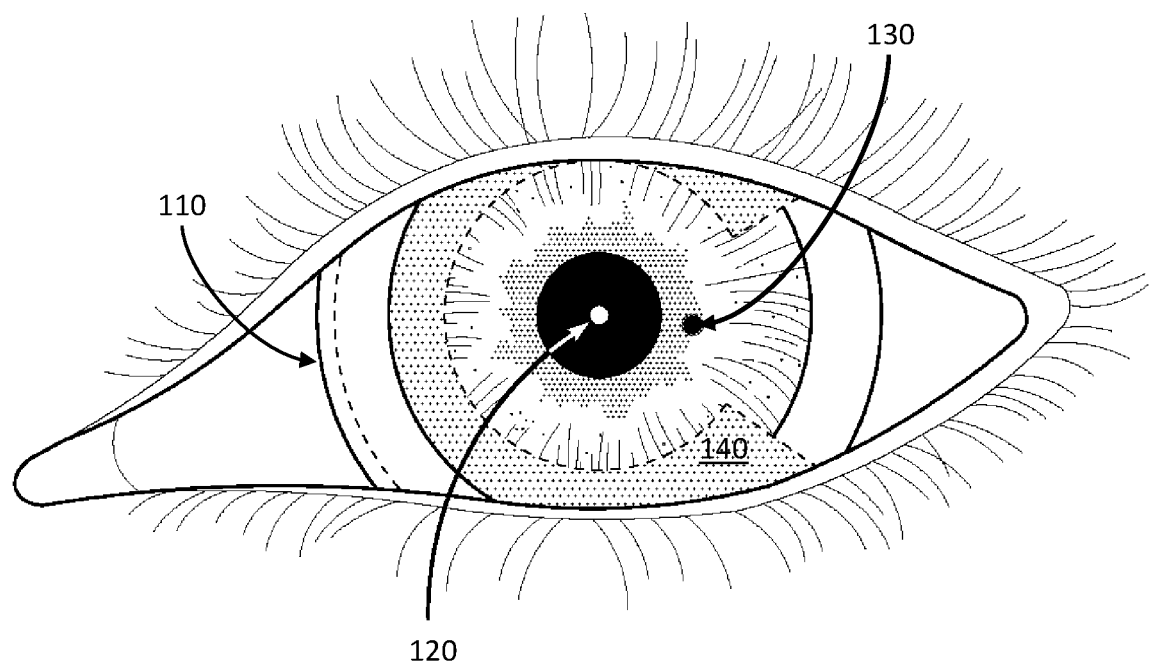
FIG. 1B shows a magnified view of the electronic contact lens mounted on the user's eye.
Figure 1C:
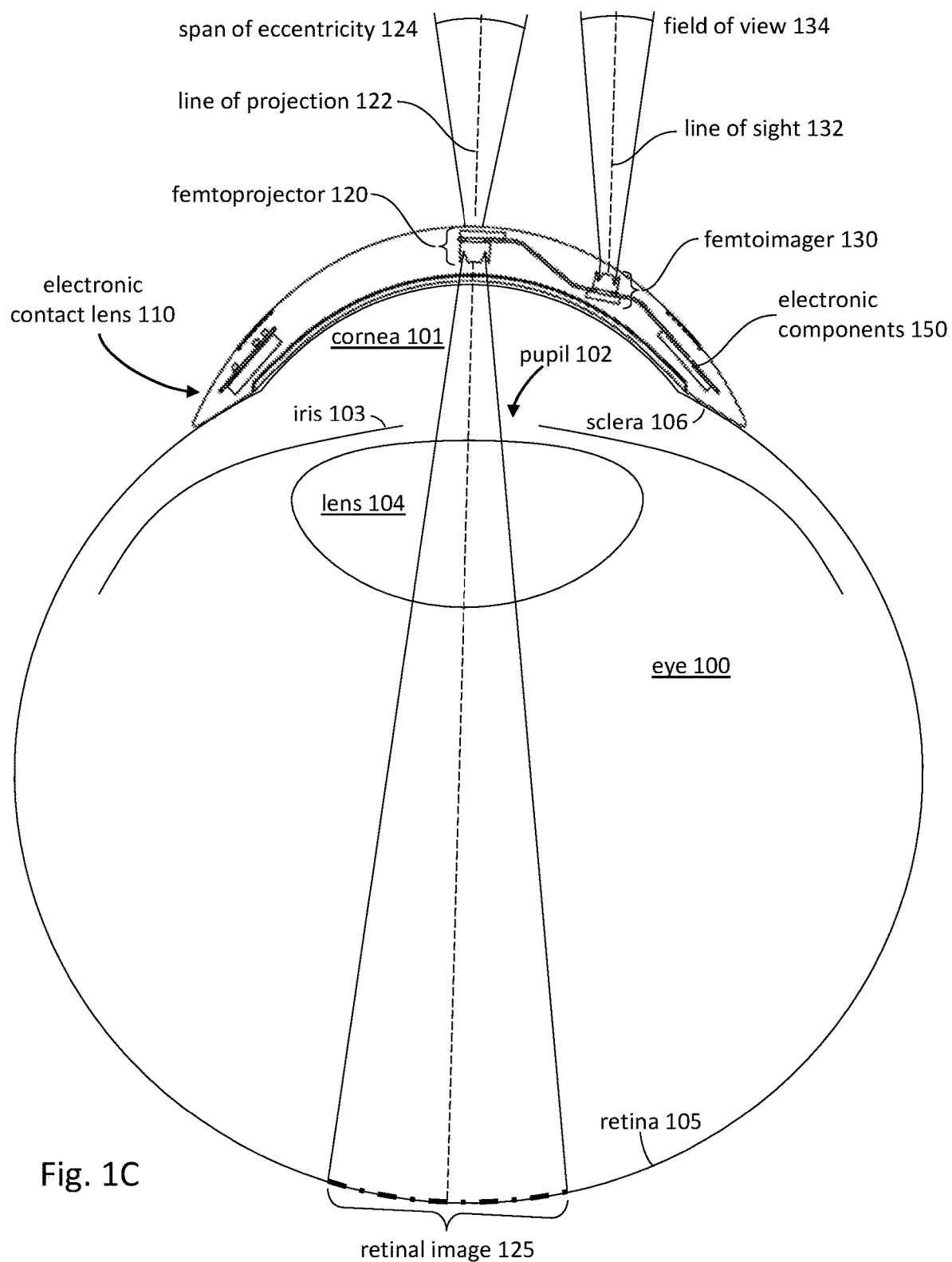
FIG. 1C shows a cross sectional view of the electronic contact lens mounted on the user's eye.

FIG. 1A shows a user wearing a pair of electronic contact lenses 110. FIG. 1B shows a magnified view of one of the electronic contact lenses 110, and FIG. 1C shows a cross sectional view of the electronic contact lens 110. The electronic contact lens 110 is worn on the surface of the user's eye. The following examples use a scleral contact lens in which the contact lens is supported by the sclera of the user's eye, but the contact lens does not have to be scleral.

As shown in FIG. 1B, the electronic contact lens 110 contains a femtoprojector 120 and a femtoimager 130. The femtoprojector 120 is a small projector that projects images inward onto the user's retina. It is located in a central region of the contact lens 110, so that light from the femtoprojector 120 propagates through the user's pupil to the retina. The femtoprojector 120 typically includes an electronics backplane (e.g., driver circuitry), a frontplane of light emitting elements (e.g., an LED array) and projection optics. The frontplane produces an image (referred to as the source image), which is optically projected by the projection optics through the various eye structures and onto the retina 105, as shown in FIG. 1C.

The femtoimager 130 is a small imager that is outward facing and captures images of the external environment. In this example, it is located outside the central region of the contact lens 110 so that it does not block light from entering the user's eye. The femtoimager 130 typically includes imaging optics, a sensor array and sensor circuitry. The imaging optics images a portion of the external environment onto the sensor array, which captures the image. The sensor array may be an array of photosensors. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 μm) or an ultraviolet band (i.e., <390 nm). For example, the sensor array may be a thermal infrared sensor.

The lead line from reference numeral 110 in FIG. 1B points to the edge of the contact lens. The femtoprojector 120 and femtoimager 130 typically are not larger than 2 mm wide. They may fit within a 2 mm×2 mm×2 mm volume.

The electronic contact lens 110 also includes other electronic components 150, which may be mounted on a flexible bus 140 located in a peripheral zone. Electronic components 150 in the lens 110 may include microprocessors/controllers, inertial sensors (such as accelerometers and gyroscopes), magnetometers, radio transceivers, power circuitry, antennas, batteries and elements for receiving electrical power inductively for battery charging (e.g., coils). Sensed data from the inertial sensors and magnetometer may be combined to estimate parameters such as position, velocity, acceleration, orientation, angular velocity, angular acceleration or other motion parameters. For clarity, connections between the femtoprojector 120, femtoimager 130 and electronics components 150 are not shown in FIG. 1B. The flexible bus 140 may optionally be cut out, for example on the temporal (as opposed to nasal) side of the electronic contact lens 110 as shown in FIG. 1B. The electronic contact lens 110 may include cosmetic elements, for example covering the electronic components 150s on the flexible bus 140. The cosmetic elements may be surfaces colored to resemble the iris and/or sclera of the user's eye.

FIG. 1C shows a cross sectional view of the electronic contact lens mounted on the user's eye. For completeness, FIG. 1C shows some of the structure of the eye 100, including the cornea 101, pupil 102, iris 103, lens 104, retina 105 and sclera 106. The electronic contact lens 110 preferably has a thickness that is less than two mm. The contact lens 110 maintains eye health by permitting oxygen to reach the cornea 101.

The femtoimager 130 is outward-facing, so that it "looks" away from the eye 100 and captures images of the surrounding environment. The femtoimager 130 is characterized by a line of sight 132 and a field of view 134, as shown in FIG. 1C. The line of sight 132 indicates the direction in which the femtoimager 130 is oriented, and the field of view 134 is a measure of how much of a scene the femtoimager 130 captures. If the femtoimager 130 is located on the periphery of the electronic contact lens 110, the contact lens surface will be sloped and light rays will be bent by refraction at this interface. Thus, the direction of the line of sight 132 in air will not be the same as the direction within the contact lens material. Similarly, the angular field of view 134 in air (i.e., the external environment) will not be the same as the angular field of view in the contact lens material. The terms line of sight 132 and field of view 134 refer to these quantities as measured in the external environment (i.e., in air).

The femtoprojector 120 projects an image onto the user's retina 105. This is the retinal image 125 shown in FIG. 1C. This optical projection from femtoprojector 120 to retina 105 is also characterized by an optical axis, as indicated by the dashed line within the eye in FIG. 1C, and by some angular extent, as indicated by the solid lines within the eye in FIG. 1C. However, the femtoprojector 120 typically will not be described by these quantities as measured internally within the eye 100. Rather, it will be described by the equivalent quantities as measured in the external environment. The retinal image 125 appears as a virtual image in the external environment. The virtual image 125 has a center, which defines the line of projection 122 for the femtoprojector 120. The virtual image 125 will also have some spatial extent, which defines the "span of eccentricity" 124 for the femtoprojector 120. As with the femtoimager line of sight 132 and field of view 134, the terms line of projection 122 and span of eccentricity 124 for the femtoprojector 120 refer to these quantities as measured in the external environment.

The femtoimager 130 and femtoprojector 120 both move together with the eye 100 because the electronic contact lens 110 is physically mounted to the eye 100. Thus, images captured by the femtoimager 130 naturally have a line of sight 132 corresponding to the user's gaze direction and virtual images projected by the femtoprojector 120 naturally move together with the eye 100. In applications where it is desirable for the projected images to remain stable relative to the environment, an image stabilization technique may be applied to keep the virtual images stable. Here, the user's gaze direction can be tracked using the on-board motion sensors and the position of the projected virtual images are shifted to compensate for changes in the gaze direction.

Images from the femtoimager 130 can also be processed to calibrate sensors of the electronic contact lens 110 such as the gyroscope and accelerometer. For example, calibration values of the gyroscope and accelerometer can be reset to compensate for drift when the images captured from the femtoimager 130 are stable over a long enough time period.

To enable the electronic contact lens 110 to present virtual images that are relevant to the user's environment, images captured by the femtoimager 130 may be processed to recognize objects in the images. Information relating to the recognized objects may then be presented by the femtoprojector 120. Recognized objects may furthermore be utilized to control various operational parameters of the electronic contact lens 110 to improve the user experience, as described in further detail below. Because the field of view from the femtoimager 130 may be small, it generally corresponds closely to the user's area of focus. By recognizing objects within this field of view, the femtoprojector 120 can present information relating to the recognized objects with a high degree of confidence that the information is relevant to the user's current area of attention.

Figure 2:
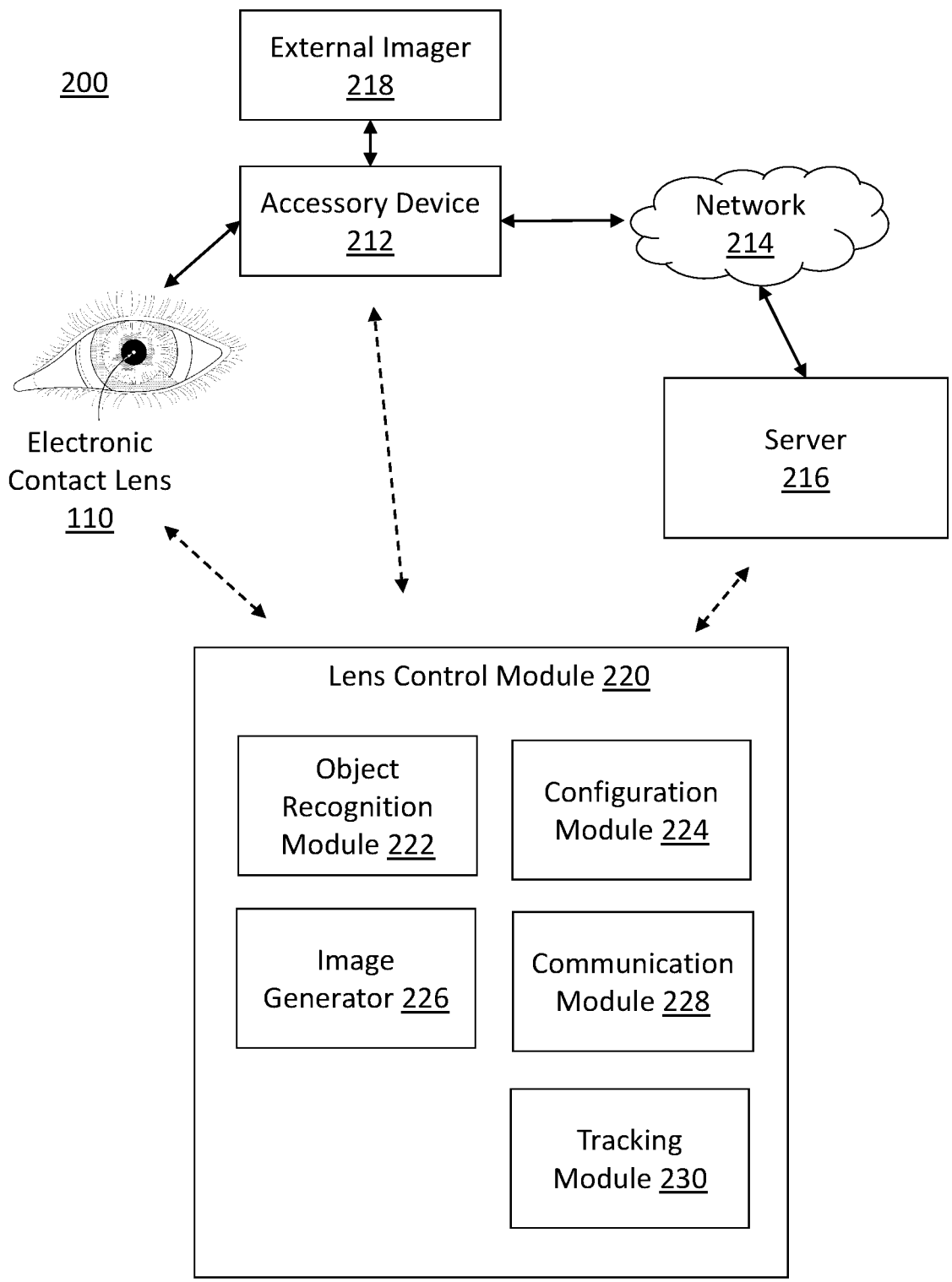
FIG. 2 is a block diagram of an augmented reality system for an electronic contact lens.

FIG. 2 shows a block diagram of an augmented reality system 200 that controls operation of the electronic contact lens 110 based on recognized objects in the surrounding environment. The augmented reality system 200 includes an electronic contact lens 110, as described above, an accessory device 212, a network 214, a server 216 and an external imager 218. The accessory device 212 is a computing device that is communicatively coupled to the electronic contact lens 110 (e.g., via a wireless interface) and performs computing or storage functions that support operation of the electronic contact lens 110. The accessory device 212 may be embodied as an electronic wearable device (e.g., necklace, headband, waistband, etc.), smartphone, smart-watch or another device. The accessory device 212 may also be connected to a server 216 via a network 214. The server 212 provides access to various information relevant to operation of the electronic contact lens 110 and may furthermore provide additional computing or storage functions that support operation of the electronic contact lens 110. The accessory device 212 may also optionally be coupled to an external imager 218. The external imager 218, if present, captures images of the external environment and may be used to supplement images captured by the femtoimager 130 of the electronic contact lens 110. The external imager 218 may capture images having a wider field of view, higher resolution or other improved image characteristics relative to the images captured by the femtoimager 130. Examples of techniques for operating an electronic contact lens 110 based on images from external imager are described in further detail in U.S. patent application Ser. No. 16/987,796 filed on Aug. 7, 2020, which is incorporated by reference herein.

A lens control module 220 directly or indirectly controls operation of the electronic contact lens 110. Various components of the lens control module 220 may be implemented in whole or in part on the electronic contact lens 110 itself, on the accessory device 212, on the server 216 or a combination thereof In some implementations, certain time-sensitive functions of the lens control module 220 may be implemented directly on the electronic contact lens 110 for low latency while other more computationally intensive functions may be offloaded to the accessory device 212 or to the server 216 to enable the electronic contact lens 110 to operate with relatively light computational and storage requirements. For example, in one implementation, the electronic contact lens 110 transfers images captured by the femtoimager 130 to the accessory device 212 for performing functions such as image stabilization, image stitching, object detection, object recognition or other image processing tasks. The accessory device 212 may perform these functions directly or may offload the functions in whole or in part to the server 216. Alternatively, the electronic contact lens 110 may perform some lightweight initial processing on the images prior to offloading them to the accessory device 212. For example, the electronic contact lens 110 may compress images or extract features from the images and send the compressed images or features to the accessory device 212 for processing instead of transferring the raw images. The task of generating virtual images for displaying on the electronic contact lens 110 can furthermore be performed in whole or in part on the accessory device 212 or the server 216 before providing the virtual images to the electronic contact lens 110 for display. Additionally, the accessory device 212 may configure various aspects of the electronic contact lens 110 that affect its operation. For example, the accessory device 212 may configure parameters of motion sensors in the electronic contact lens 110.

The lens control module 220 includes an object recognition module 222, a configuration module 224, an image generator 226, a communication module 228 and a tracking module 230. The object recognition module 222 obtains images captured by the femtoimager 130 and generates a recognition result indicative of an object recognized in the images. The recognition result can comprise, for example, an identification of an inanimate object, an identification of a face or an identification on an environment depicted by the images. In various applications, the object recognition module 222 may recognize an object based on a single image or based on a sequence of captured images. Furthermore, in some applications, the object recognition module 222 recognizes objects based in part on images captured by the external imager 218.

The image generator 226 generates virtual images for display by the femtoprojector 120. The virtual images may be text, graphics or control elements that are projected by the femtoprojector 120 onto the user's eye 100. The image generator 226 generates images in part based on the recognition result from the object recognition module 222 so that the displayed virtual objects are relevant to the objects recognized in the user's environment. The image generator 226 may query various information systems (e.g., an internet search engine) to identify information relevant to recognized object and generate the virtual images accordingly. In some embodiments, the image generator 226 may include an audio device that generate audios or a haptic device that generates haptic feedback to output together with or instead of the virtual images. The recognition results may also be stored to a history of recognized objects and does not necessarily immediately affect the displayed visual information. At a later time, visual information may be generated based on the history of recognized objects. Examples of applications that generate virtual images based on recognized objects are described below with respect to FIGS. 3-7.

The communication module 228 facilitates communication with external systems to acquire information for displaying by the electronic contact lens 110 or to control external systems based on interactions using the electronic contact lens 110. For example, the communication module 228 may communicate with external web-based resources, search engines or local control systems (e.g., an in-vehicle electronic system or in-home smart hub) to obtain information about recognized objects. The communication module 228 may also communicate with external connected devices to provide control signals for controlling external systems. For example, the communication module 228 may communicate with an in-home smart hub or in-vehicle electronic system to send commands that control functions of those systems or devices connected to them. An example of an application that utilizes this control function is described below with respect to FIGS. 3A-B.

The tracking module 230 obtains motion data from motion sensors of the electronic contact lens 110 and tracks changes in the gaze direction. This information can be used to facilitate location tracking of recognized objects relative to the current gaze direction, to facilitate image stitching, to facilitate image stabilization or to facilitate other functions of the electronic contact lens 110 described herein. Examples of applications that utilizes the tracking function are described below with respect to FIGS. 6-7.

Figure 3A:
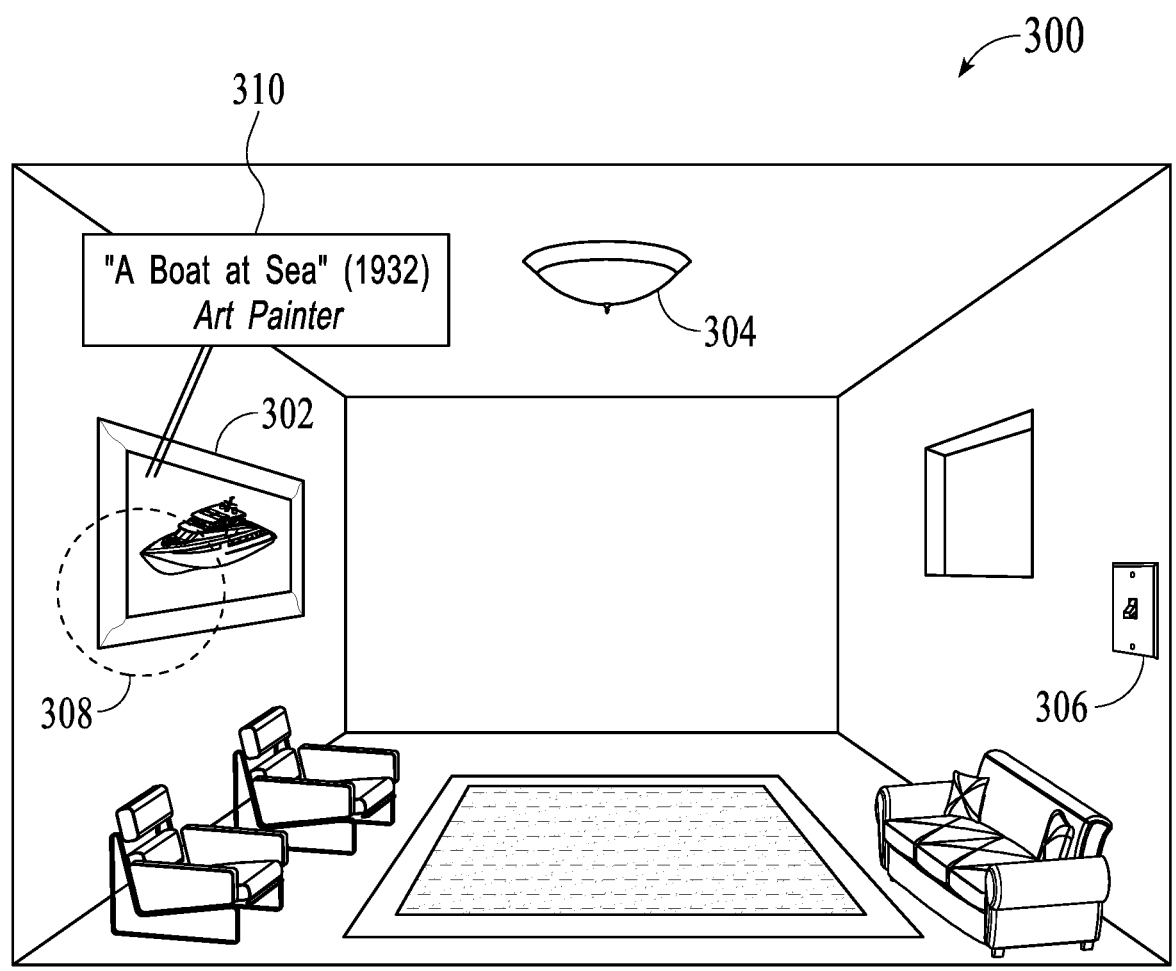
FIG. 3A is an example of an environment for tracking a gaze of a user wearing an electronic contact lens.
Figure 3B:
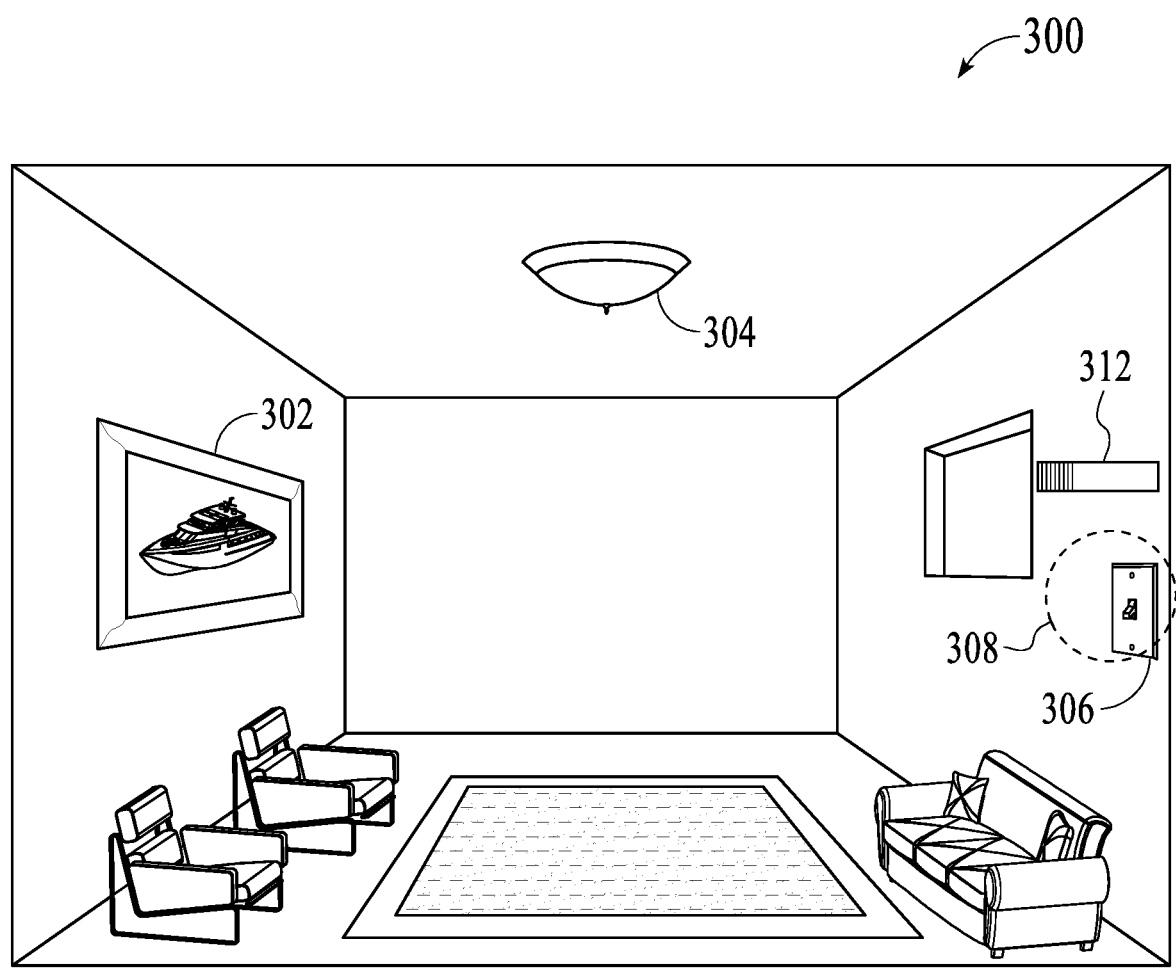
FIG. 3B is an example of the environment in which a virtual control element is displayed in response to detecting that the user's gaze is focused on a recognized controllable object.

FIG. 3A-B illustrate an example application for the augmented reality system 200. FIGS. 3A-B depict a scene 300 (e.g., a room of a house) that includes, among other objects, a painting on a wall 302, a ceiling light 304 and a light switch 306. The field of view of the femtoimager 130 is represented by the dashed circle 308. The femtoimager is aligned with the user's gaze, so the dashed circle 308 also represents the central area of the user's gaze. In FIG. 3A, the user's gaze is focused on the painting 302. Since the femtoimager 130 of the electronic contact lens 110 naturally tracks the user's gaze, it captures an image with a field of view 308 that represents the central area of the user's gaze. The lens control module 220 performs object recognition on the image from the femtoimager 130 and recognizes that the captured image is a painting of a boat. The lens control module 220 may furthermore query an information system (e.g., a web search engine or database) to obtain information about the painting 302 such as the name of the painting and the artist. The lens control module 220 then generates visual information 310 based on the object recognition and causes the femtoprojector 120 to project the information as a virtual image (e.g., text displaying the name of the painting and the artist). Here, the visual information 310 is projected directly onto the user's retina and thus appears to the user as a virtual object even though it is not actually present in the scene 300. Alternatively, or in addition, the lens control module 220 generates an audio clip related to the obtained information (e.g., speech stating the name of the painting and artist).

As the user's gaze moves around in the scene 300, the user may be presented with different information based on other recognized objects. Some recognized objects may trigger presentation of interactive elements (e.g., controls). For example, in FIG. 3B, the user's gaze moves to the light switch 306 as indicated by the dashed lines 308. The femtoimager 130 captures an image and the lens control module 220 performs object recognition to recognize that the image contains the light switch 306. The lens control module 220 also recognizes that the light switch is a smart dimmer switch with wireless connectivity that is controllable by the lens control module 220. This determination may be made, for example, based on a unique visual feature of the light switch 306 (e.g., a bar code, QR code, serial number or visual features of the light switch 306) that the lens control module 220 associates with a specific controllable smart switch. Alternatively, the lens control module 220 may recognize the switch 306 as a controllable smart switch by detecting its location as corresponding to the location of a known smart switch. In response to this detection, the lens control module 220 generates a virtual control element 312 for projecting by the femtoprojector 120. The user can then interact with the virtual control element 312 to control the dimming setting associated with the switch 306. For example, in response to an interaction, the lens control module 220 sends a control signal to the light switch 306 or to a smart hub controlling the light switch 306 that adjusts the dimming level accordingly. Here, the interaction may include, for example, an interaction with a touch screen, button or other control element on the accessory device 212, a voice command, a hand gesture command or an eye gesture command detectable by the lens control module 220 from motion data of the electronic contact lens 110. The lens control module 220 may also output audio relevant to the virtual control element 312. For example, the lens control module 220 an audio prompt instructing the user to provide a control input or may provide audio feedback in response to received interactions with the virtual control element 312.

While in this example, an actual switch 306 is depicted in the scene 300, the lens control module 220 can alternatively trigger display of the virtual control element 312 based on other conditions. For example, in an embodiment, the virtual control element 312 may be instantiated in response to the lens control module 220 recognizing that the user is looking at the light 304. In other instances, the control element 312 may be triggered in response to recognizing that the user's gaze is directed to a remote control panel, a hub device or any other object associated with operation of the light 304.

Figure 4A:
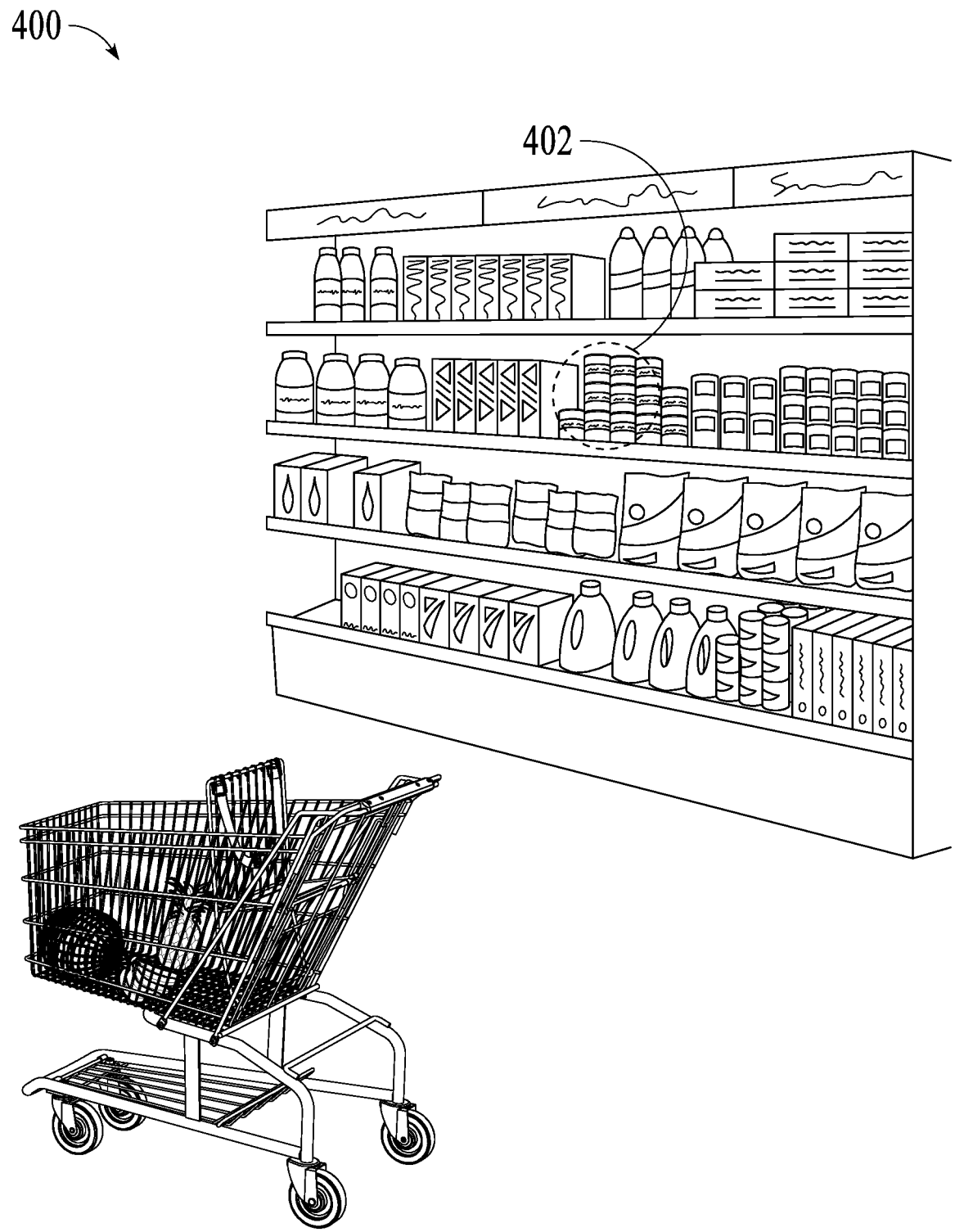
FIG. 4A is another example of an environment for tracking a gaze of a user wearing an electronic contact lens.
Figure 4B:
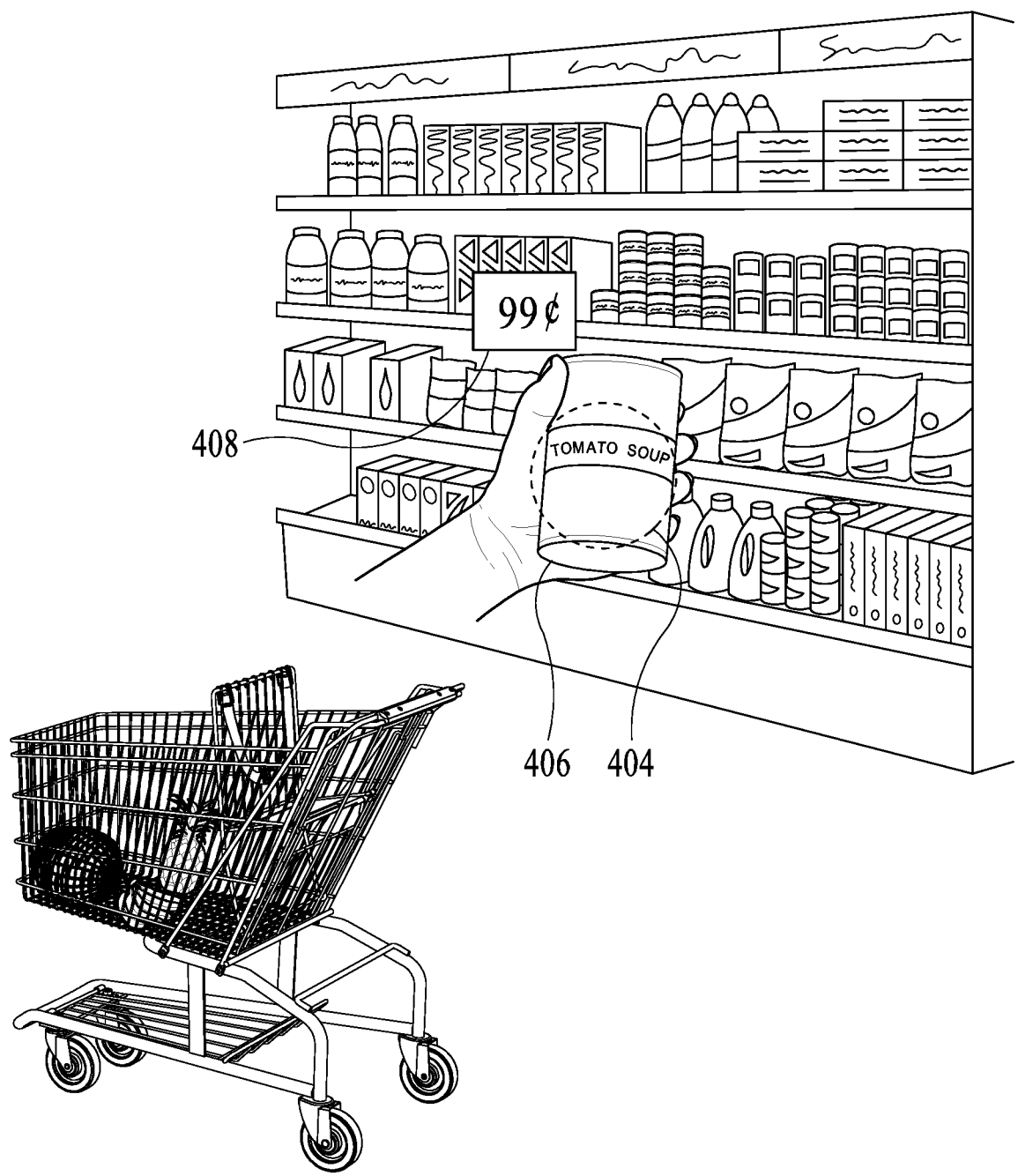
FIG. 4B is an example of the environment in which visual information is displayed in response to detecting that the user's gaze is focused on a recognized object.

FIGS. 4A-B illustrate another example application of the augmented reality system 200. In this example, the user is in a grocery store 400 browsing items on a shelf. In FIG. 4A, the user's gaze 402 is centered in a crowded area of the shelf. The image captured by the femtoimager 130 contains multiple different objects and the surrounding area includes many other objects. Thus, as the user's gaze scans the shelves, a very large number of objects may be encountered over a very short time period. In this situation, recognizing every object and presenting information about each of them may be overwhelming and distracting to the user. Here, the lens control module 220 may instead detect that a large number of objects (e.g., over a predefined threshold value) are present within the set of images captured by the femtoimager 130 within a limited time window and temporarily disable presentation of information to avoid creating a distraction.

In FIG. 4B, the user picks up a specific object 406 (e.g., a can of soup) and the user's gaze focuses on the object being held. Now, the field of view 404 contains only a single object 406 that is clearly of interest to the user. The lens control module 220 recognizes that the user is focused on this object (e.g., by detecting that it remains in the field of view 404 for at least a threshold period of time), perform recognition on the object 406 and provide visual information 408 as a projected virtual image relevant to the recognized object 406. In this case, the lens control module 220 recognizes the object as a can of soup, queries a price database associated with the can of soup 406 and displays a price for the can of soup 406 as a virtual price tag 408. Alternatively, or in addition, the information may be presented as an audio clip.

Figure 5:
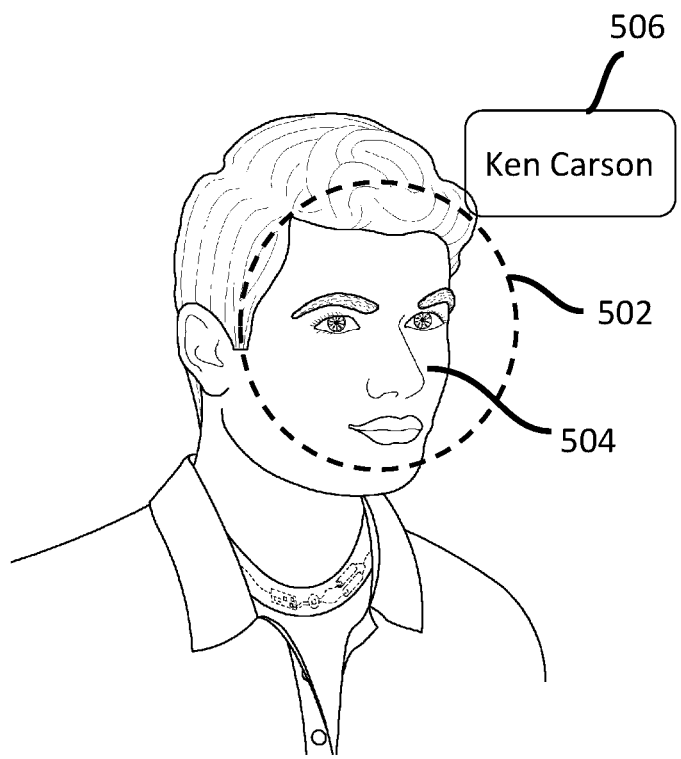
FIG. 5 is another example of visual information displayed in response to detecting that the user's gaze is focused on a recognized object.

FIG. 5 illustrates another example application of the augmented reality system 200. Here, the field of view 502 is focused on a face 504. The femtoimager 130 captures an image of the face 504 and the lens control module 220 performs facial recognition to identify the individual. The recognition result (e.g., the individual's name) is provided to the electronic contact lens 110 and projected the femtoprojector 120 as a virtual object 506.

Because object recognition can be a computationally intensive process, the lens control module 220 may utilize object tracking to obtain recognition results more efficiently, without necessarily performing object recognition on every captured frame. Here, once an object is recognized, the lens control module 220 may track the location of the object relative to the user's gaze direction. For example, based on motion data from the motion sensor, the lens control module 220 determines a current direction of the user's gaze relative to its position when the object was detected. The lens control module 220 can later detect when the user's gaze returns to the original position associated with the object and present visual information associated with the recognized object without necessarily repeating the object recognition algorithm.

Figure 6:
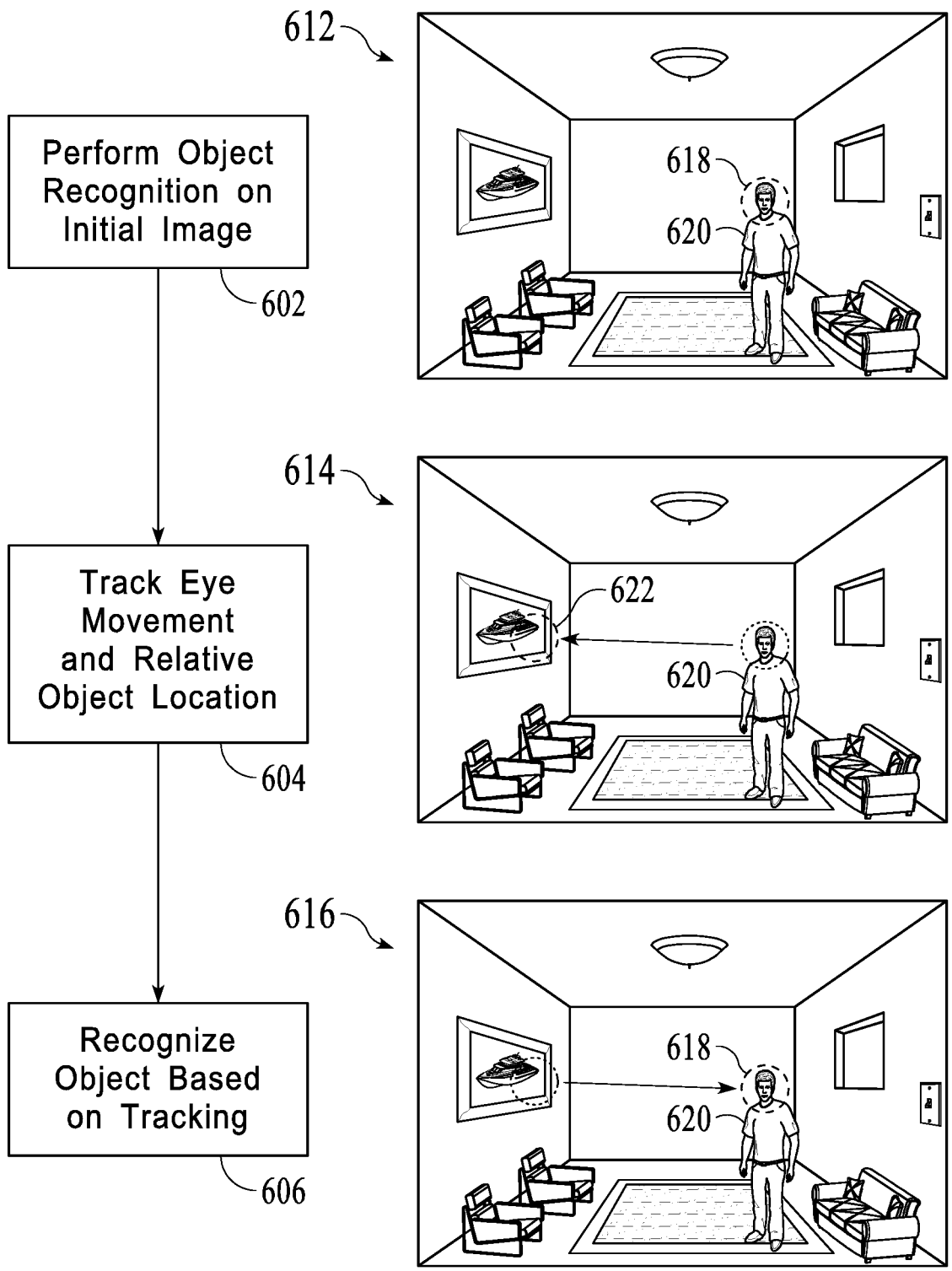
FIG. 6 is a flowchart illustrating an example embodiment of a process for tracking a location of a recognized object.

FIG. 6 is a flowchart illustrating an example of this process. At an initial frame time 612, the user's gaze and the field of view 618 of the femtoimager 130 is focused on a face of an individual 620. The femtoimager 130 captures an initial image and the lens control module 220 performs 602 object recognition to recognize the face. As the user's gaze direction changes, the lens control module 220 tracks 604 the movement based on the motion sensor data from the electronic contact lens 110. For example, at a second frame time 614, the user's gaze shifts to look at the painting on the wall. The femtoimager 130 captures another image with a field of view 622 that is shifted relative to the field of view 618 captured in the original image frame 612. The field of view 618 may be overlapping or non-overlapping with the field of view 622. Based on the motion data, the lens control module 220 determines the change in direction of the user's gaze and thus tracks the relative position of the face of the individual 620 relative to the user's current gaze direction. At a third frame time 616, the user looks back at the face of the individual 620. Thus, the face is again in the field of view 618 of the image captured by the femtoimager 130. Based on the motion data from the electronic contact lens 110, the lens control module 220 detects when gaze direction re-aligns with the direction when the face was previously recognized.

Based on the motion tracking, the lens control module 220 can recognize 606 the object as the same face recognized previously, without reperforming the facial recognition algorithm.

In one embodiment, the lens control module 220 may place a time limit on how long it relies on location tracking information for object recognition. Here, the lens control module 220 determine how much time has passed in between the original frame time 612 when the object recognition was performed and the current frame time 616 when the user's gaze returns to the same gaze direction. If the time is less than a threshold, the lens control module 220 may predict that the same object is present without re-performing object recognition. However, if the time is greater than the threshold, the lens control module 220 may instead re-perform the object recognition. In this way, the lens control module 220 can manage the balance between efficiently obtaining recognition results using tracking and the likelihood of an error occurring due to an object moving during a frame time 614 when it is outside of the field of view 622 of the femtoimager 130.

In another example implementation, the lens control module 220 performs an object detection algorithm when it detects the gaze returning to a position where an object was previously recognized. The object detection algorithm is less computationally intensive than the object recognition algorithm. For example, when the gaze returns to the gaze direction of the recognized face, the lens control module 220 detects if a face is present without re-performing the full facial recognition. If a face is present, the lens control module 220 predicts that it is the same face recognized previously.

Because the field of view of the femtoimager 130 may be relatively narrow, a single image often provides only limited information about a large object or an environment. Thus, a single image from the femtoimager 130 may be insufficient for accurate recognition. In some instances, the lens control module 220 stitches together multiple images corresponding to different gaze directions to generate a stitched image covering a wider field of view than the individual images. The lens control module 220 can perform object recognition on the stitched image to generate the recognition result.

Figure 7:
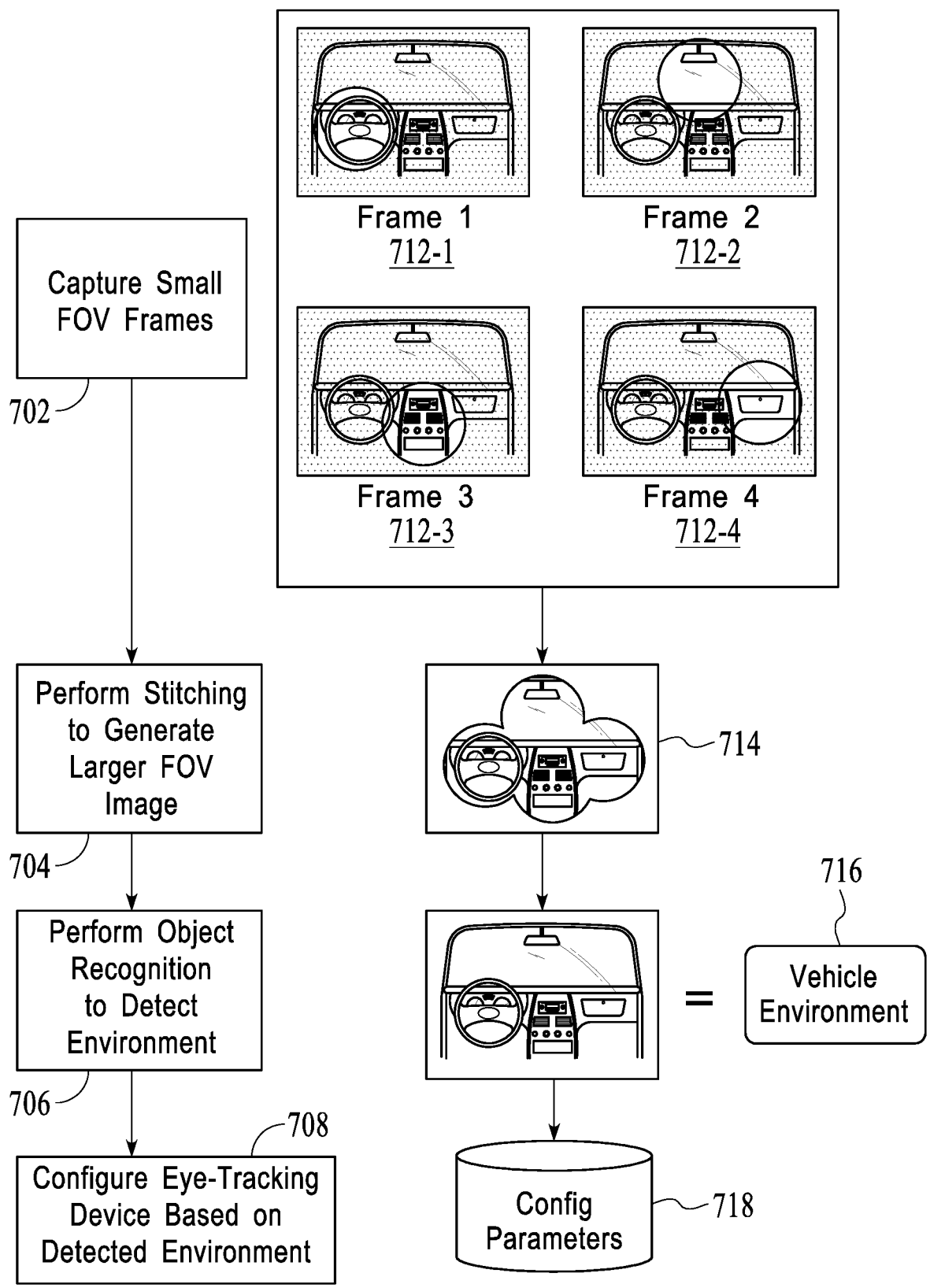
FIG. 7 is a flowchart illustrating an example embodiment of a process for configuring operation of the electronic contact lens based on a recognized environment detected from a set of stitched images.

FIG. 7 is a flowchart illustrating an example of this technique as applied to an in-vehicle environment. The lens control module 220 captures 702 a series of image frames 712-1, 712-2, 712-3, 712-4 that each have relatively small fields of view. The relative positions associated with each image within an environment is determined based on motion data of the electronic contact lens 110. For example, in the illustrated scene, four images 712 are captured at different relative positions within a vehicle as the user's gaze moves around the vehicle. The lens control module 220 performs 704 stitching of the images to generate a larger field of view image 714. Here, the individually captured images are appropriately aligned based on their detected relative positions. The lens control module 220 then performs 706 object recognition on the stitched image. In this example, the recognition result indicates that stitched image corresponds to an in-vehicle environment 716. The lens control module 220 generates configuration parameters 718 and configures 708 the electronic contact lens 110 based on the detected environment. Here, the configuration may cause the femtoprojector 130 to present visual information associated with the detected environment. For example, by recognizing that the user is in a vehicle, the electronic contact lens 110 may execute an application corresponding to a vehicle mode in which the femtoprojector 130 projects virtual images providing information such as vehicle speed, navigation directions, radio or media controls or other in-vehicle information or controls.

The lens control module 220 can furthermore configure operational parameters of the electronic contact lens 110 based on the recognition result. For example, because different environments can differently affect the magnetometer or inertial sensors, the lens control module 220 can calibrate the magnetometer or inertial sensors based on the detected environment. This calibration mechanism ensures accurate sensing in various environments without the user having to manually recalibrate the device each time the environment changes. Here, different calibration parameters may be stored in association with different detectable environments including, for example, an in-building environment, an outdoors environment, an in-vehicle environment or an in-home environment. Calibration parameters may also be stored for specific locations instead of general categories (e.g., inside the user's home).

In an example implementation, the environment may be detected using the technique of FIG. 7 described above. If calibration has not yet been performed in the detected environment or if a long enough time period has passed since the last calibration, a calibration process may be performed and the calibration values stored in association with the detected environment. When the same environment is later detected, the associated calibration parameters associated with the detected environment are loaded and applied to the electronic contact lens 110, without necessarily re-performing the calibration process.

In another example implementation similar to FIG. 7, the lens control module 220 obtains a wide field of view image from the external imager 218 and performs object recognition on the wide field of view image or a portion thereof. For example, instead of stitching together multiple narrow field of view images from the femtoimager 120 as described above, the lens control module 220 obtains a wide field of view image from the external imager 218 and identifies an area of the image that corresponds to image captured by the femtoimager 120. Object recognition can then be performed on the relevant portion of the wide field of view image.

Figure 8:
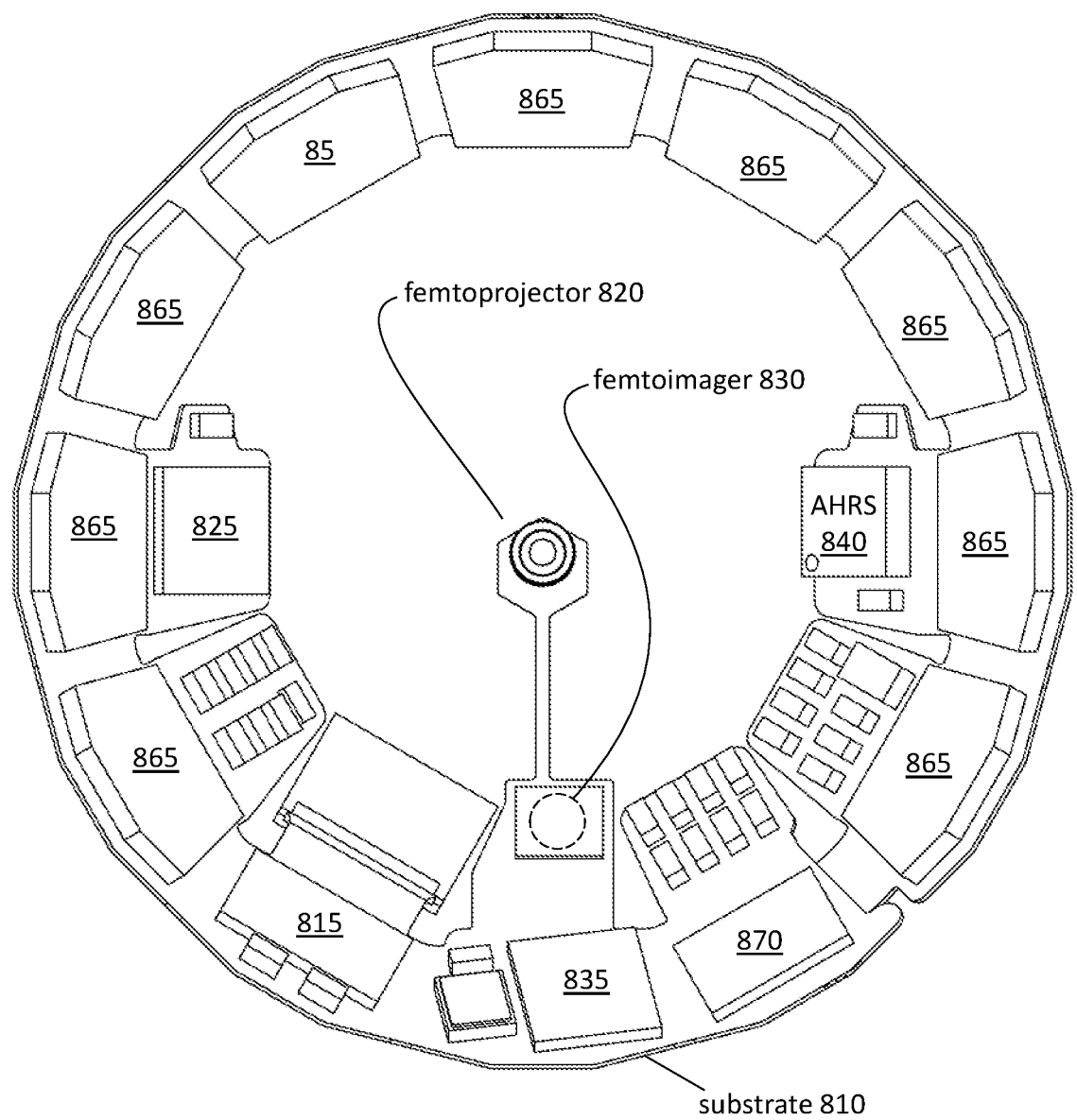
FIG. 8 is a posterior view of an electronics assembly for use in an electronic contact lens.

The above described techniques can be implemented using electronic contact lenses 110 having varying levels of on-board capabilities. As described above, different functions of the lens control module 220 may be performed on the electronic contact lens 110 itself, on the accessory device 212 or on a remote server 216. FIG. 8 is a posterior view of an assembly for one example variation of an electronic contact lens 110 in which certain functions are implemented on-lens and other functions are implemented off-lens. The electronics assembly is approximately dome-shaped to fit into the electronic contact lens 110. The posterior view of FIG. 8 shows a view from inside the dome. The perimeter of the dome is close to the viewer and the center of the dome is away from the viewer. The surfaces shown in FIG. 8 face towards the user's eye when the user is wearing the contact lens.

This design has a flexible printed circuit board 810 on which the different components are mounted. Conductive traces on the circuit board provide electrical connections between the different components. This flexible substrate 810 may be formed as a flat piece and then bent into the three-dimensional dome shape to fit into the electronic contact lens 110. In the example of FIG. 8, the components include the femtoprojector 820 and the femtoimager 830. The femtoimager 830 is facing outwards, so it is on the opposite side of the substrate 810 and is shown by hidden lines in FIG. 8. Other components include receiver/transmitter circuitry 815, image processing circuitry 825, a display pipeline 835, attitude and heading sensors and circuitry 840 (such as accelerometers, magnetometers and gyroscopes), batteries 865 and power circuitry 870. The electronic contact lens 110 may also include antennae and coils for wireless communication and power transfer.

The functionality of the electronic contact lens 110 includes a data/control receive path, a data/control transmit path and a power subsystem. In this example, the receive path of the data/control subsystem includes an antenna (not shown in FIG. 8), receiver/transmitter circuitry 815, a display pipeline 835 and the femtoprojector 820. Data from an external source (e.g., the accessory device 212) is wirelessly transmitted to the contact lens 110 and received via the antenna. The receiver circuitry 815 performs the functions for receiving the data, for example demodulation, noise filtering and amplification. It also converts the received signals to digital form. The display pipeline 835 processes the digital signals for the femtoprojector 820. These functions may include decoding and timing. The processing may also depend on other signals, other types of image processing, or ambient light sensing. The femtoprojector 820 projects the images onto the wearer's retina. In this example, the femtoprojector 820 includes a CMOS ASIC backplane, LED frontplane and projection optics.

The data/control subsystem may also include a back channel through transmitter circuitry 815 and the antenna. For example, if part of the image processing is performed off-lens, the relevant data may be transmitted through this back channel to the off-lens component(s). The electronic contact lens 110 may also transmit other types of sensor data, control data and/or data about the status of the electronic contact lens 110.

In the illustrated example implementation, the electronic contact lens 110 includes a feedback path from the femtoimager 830 to the femtoprojector 820. Images captured by the femtoimager 830 may be processed by image processing circuitry 825. If image processing is performed entirely on-lens, then the image processing circuitry 825 feeds back to the data pipeline for the femtoprojector 820. If off-lens processing is used, then data is transmitted from the image processing circuitry 825 via the back channel to off-lens components. Results from those components are then returned to the electronic contact lens via the data/control receive path. The image processing described above may be used in combination with eye tracking from the AHRS (attitude and heading reference system) 840.

Power may be received wirelessly via a power coil. This is coupled to circuitry 870 that conditions and distributes the incoming power (e.g., converting from AC to DC if needed). The power subsystem may also include energy storage devices, such as batteries 865 or capacitors. Alternatively, the electronic contact lens may be powered by batteries 865 and the batteries recharged wirelessly through a coil. An electronic assembly for use in an electronic contact lens is described in further detail in U.S. patent application Ser. No. 16/554,399 filed on Aug. 28, 2019, which is incorporated by reference herein.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from and to transmit data and instructions to, a data storage system, at least one input device and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for generating visual information for projecting by a femtoprojector of an electronic contact lens mounted on a user's eye based on a recognized object, the method comprising:
    capturing, by a femtoimager of the electronic contact lens, one or more images of a user's surrounding environment;
    performing object recognition on the one or more images to generate a recognition result indicating a recognized object;
    obtaining, based on the recognition result, an initial location of the recognized object in an initial image captured by the femtoimager;
    tracking changes in orientation of the electronic contact lens based on motion data derived from a sensor of the electronic contact lens;
    estimating a subsequent location of the recognized object in a subsequent image based on the initial location of the recognized object in the initial image and the tracked changes in orientation;
    processing the recognition result to generate the visual information for projecting by the femtoprojector; and
    projecting, by the femtoprojector, the visual information on the user's retina in a direction based on the subsequent location of the recognized object.

2. The method of claim 1, wherein performing the object recognition comprises:

stitching the one or more images to generate a stitched image, the one or more images having respective fields of view smaller than the recognized object; and processing the stitched image to generate the recognition result.

3. The method of claim 1, wherein performing the object recognition comprises:

obtaining a wide field of view image from an external imager outside the electronic contact lens;

identifying from the one or more images obtained by the femtoimager, a region of the wide field of view image corresponding to the user's gaze; and performing the object recognition within the identified region of the wide field of view image.

4. The method of claim 1, wherein generating the visual information comprises:

storing the recognition result in a history of recognized objects; and generating the visual information based on the history of recognized objects.

5. The method of claim 1, further comprising:

predicting an environment of the user based on the recognition result; and causing the electronic contact lens to execute an application associated with the predicted environment.

6. The method of claim 1, further comprising:

determining that the recognized object corresponds to a predefined set of objects having a controllable function;

causing the femtoimager to project a virtual control element for controlling the controllable function of the recognized object;

detecting an interaction with the virtual control element; and responsive to the detected interaction, transmitting a control signal to a control device associated with the recognized object to control the controllable function in accordance with the detected interaction.

7. The method of claim 1, wherein further comprising:

obtaining an audio clip associated with the recognized object; and outputting the audio clip.

8. The method of claim 1, wherein processing the recognition result comprises:

communicating with a remote server to obtain information relating to the recognized object; and generating the visual information for projecting by the femtoprojector based on the obtained information from the remote server.

9. The method of claim 1, wherein performing the object recognition comprises:

transmitting the one or more images from the electronic contact lens to an accessory device; and performing the object recognition on the accessory device based on the one or more images.

10. The method of claim 9, wherein performing the object recognition on the accessory device comprises:

querying a remote server to obtain the recognition result.

11. The method of claim 1, wherein performing the object recognition comprises:

extracting, by processing circuitry, of the electronic contact lens, features of the one or more images;

transmitting the features from the electronic contact lens to an accessory device; and performing the object recognition on the accessory device based on the features.

12. A method for generating visual information for projecting by a femtoprojector of an electronic contact lens mounted on a user's eye, the method comprising:

capturing, by a femtoimager of the electronic contact lens, one or more images of a user's surrounding environment;

performing content recognition on the one or more images to predict an environment of the user;

adjusting one or more calibration parameters of one or more sensors of the electronic contact lens based in part on the predicted environment;

obtaining sensor data from the one or more sensors of the electronic lens;

estimating an orientation of the electronic contact lens based on the sensor data and the one or more calibration parameters of the one or more sensors;

generating visual information for projecting by the femtoprojector based on the estimated orientation; and projecting, by the femtoprojector, the visual information on the user's retina.

13. The method of claim 12, wherein the predicted environment of the user is selected from one of: outdoors, inside a building, inside the user's home, or inside a vehicle.

14. The method of claim 12, wherein the one or more sensors comprises a magnetometer, and wherein sensor data comprises an estimated magnetic field.

15. The method of claim 12, wherein the one or more sensors comprises an inertial sensor, and wherein sensor data comprises sensed motion data.

16. A system comprising:

an electronic contact lens comprising:

a femtoimager to capture one or more images of a user's surrounding environment;

a transceiver to transmit the one or more images and to receive visual information;

a femtoprojector to project the visual information on the user's retina; and at least one sensor to generate sensor data for deriving an orientation of the electronic contact lens in response to a change in the user's gaze;

an accessory device comprising:

a processor; and a non-transitory computer-readable storage medium storing instructions for generating the visual information, the instructions when executed by the processor causing the processor to perform steps including:

obtaining the one or more images and the sensor data from the electronic contact lens;

performing content recognition on the one or more images to predict an environment of the user;

adjusting one or more calibration parameters for the at least one sensor of the electronic contact lens based in part on the predicted environment;

estimating an orientation of the electronic contact lens based on the sensor data and the one or more calibration parameters for the at least one sensor;

generating visual information for projecting by the femtoprojector based on the estimated orientation; and causing the femtoprojector to project the visual information.

17. The system of claim 16, further comprising:

an external imager outside the electronic contact lens to capture an external image having a wider field of view than a narrow field of view of the one or more images captured by the femtoimager; and wherein performing content recognition comprises identifying a region of the external image encompassing the narrow field of view of the one or more images captured by the femtoimager, and performing the content recognition on the region of the external image.

18. The system of claim 16, wherein the accessory device further comprises:
a transceiver to communicate with a remote server; and
wherein performing the content recognition comprises querying the remote server to obtain the predicted environment.

19. The system of claim 16, further comprising:
an audio output device to obtain an audio clip associated with the predicted environment and output the audio clip.

20. The system of claim 16, wherein the one or more sensors comprises a magnetometer, and wherein sensor data comprises an estimated magnetic field.

21. The system of claim 16, wherein the one or more sensors comprises an inertial sensor, and wherein sensor data comprises sensed motion data.

22. A system comprising:
an electronic contact lens comprising:
 a femtoimager to capture one or more images of a user's surrounding environment;
 a transceiver to transmit the one or more images and to receive visual information;
 a femtoprojector to project the visual information on the user's retina; and
 at least one sensor to generate sensor data associated with motion of the electronic contact lens;
an accessory device comprising:
 a processor; and
 a non-transitory computer-readable storage medium storing instructions for generating the visual information, the instructions when executed by the processor causing the processor to perform steps including:
  obtaining the one or more images and the sensor data from the electronic contact lens;
  performing object recognition on the one or more images to generate a recognition result indicating a recognized object;
  obtaining, based on the recognition result, an initial location of the recognized object in an initial image captured by the femtoimager;
  tracking changes in orientation of the electronic contact lens based on the sensor data from the at least one sensor;
  estimating a subsequent location of the recognized object in a subsequent image based on the location of the recognized object in the initial image and the tracked changes in orientation;
  processing the recognition result to generate the visual information for projecting by the femtoprojector; and
  causing the femtoprojector to project the visual information in a direction based on the subsequent location of the recognized object.

23. The system of claim 22, wherein the instructions when executed further cause the processor to perform steps including:
 determining that the recognized object corresponds to a predefined set of objects having a controllable function;
 causing the femtoimager to project a virtual control element for controlling the controllable function of the recognized object,
 detecting an interaction with the virtual control element; and
 responsive to the detected interaction, transmitting a control signal to a control device associated with the recognized object to control the controllable function in accordance with the detected interaction.

* * * * *